S. CLIFTON.
TRACTOR TRANSMISSION.
APPLICATION FILED AUG. 28, 1919.
1,392,865.
Patented Oct. 4, 1921.
2 SHEETS—SHEET 1.
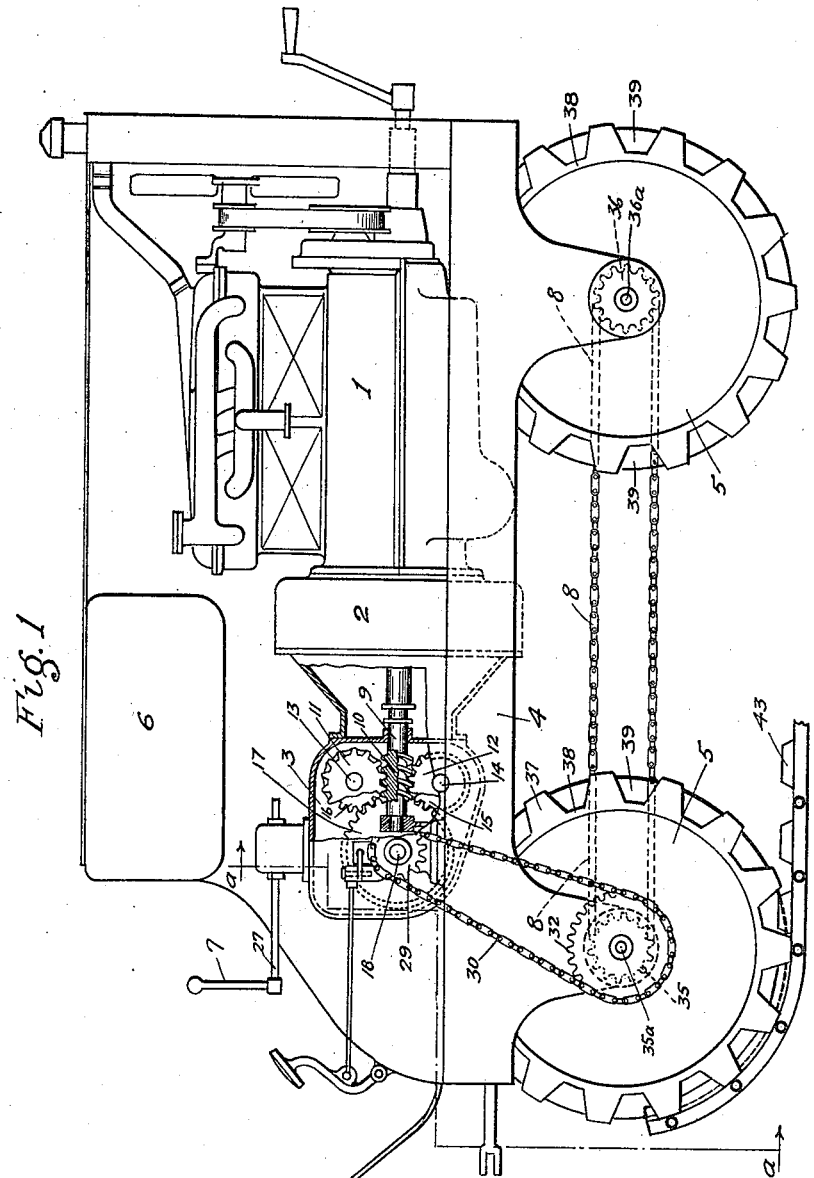
INVENTOR
S. CLIFTON
BY
Hazard & Miller
HIS ATTORNEYS

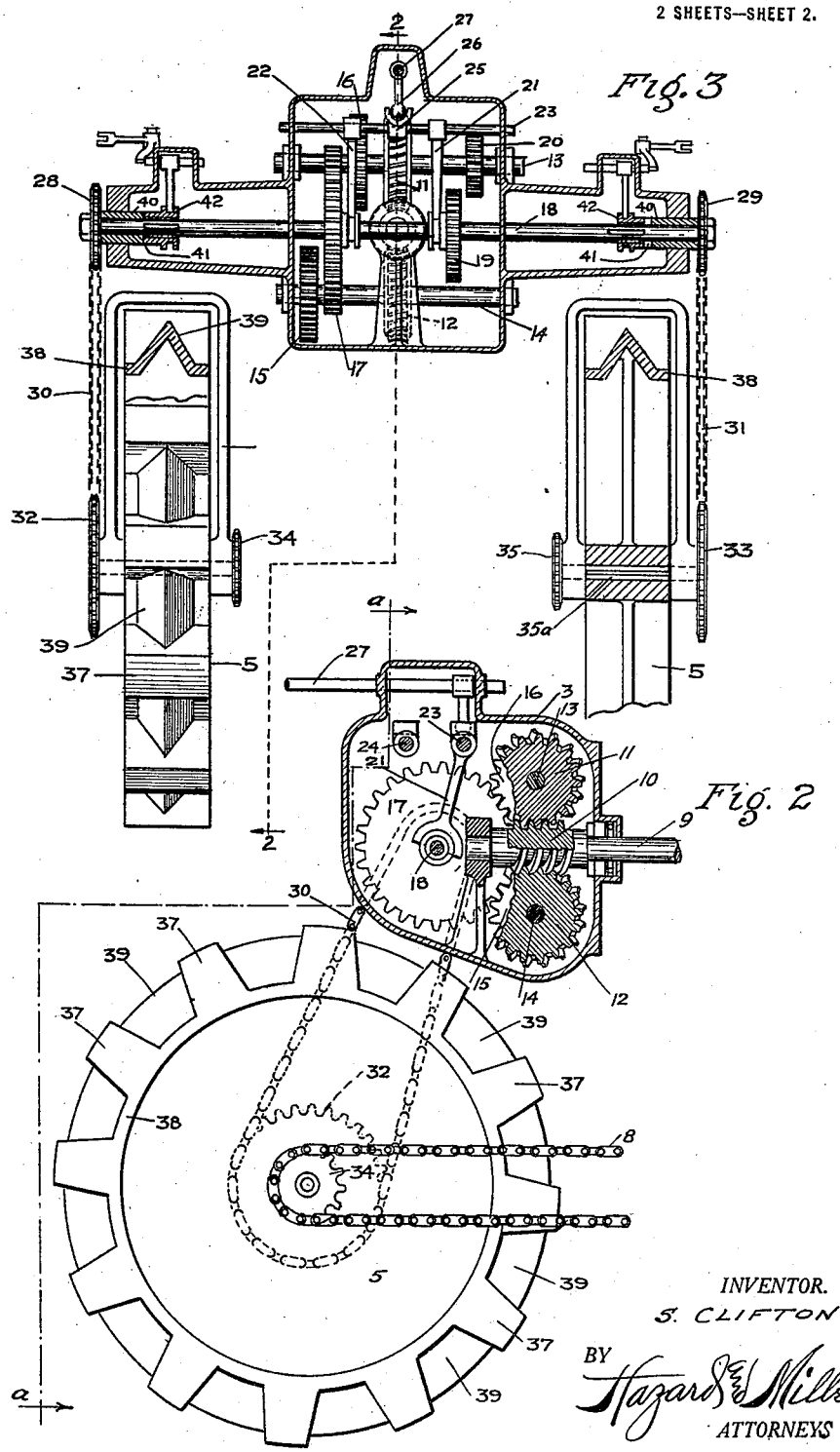

UNITED STATES PATENT OFFICE.

SYDNEY CLIFTON, OF LOS ANGELES, CALIFORNIA, ASSIGNOR TO SHERMAN T. ALLEN, OF LOS ANGELES, CALIFORNIA.

TRACTOR TRANSMISSION.

1,392,865. Specification of Letters Patent. Patented Oct. 4, 1921.

Application filed August 28, 1919. Serial No. 320,532.

*To all whom it may concern:*

Be it known that I, SYDNEY CLIFTON, a citizen of the United States, residing at Los Angeles, in the county of Los Angeles and State of California, have invented new and useful Improvements in Tractor Transmissions, of which the following is a specification.

My invention relates to tractor transmissions and consists of the novel features herein shown, described and claimed.

Figure 1 is a side elevation of a tractor provided with a tractor transmission in accordance with the principles of my invention, parts being broken away and shown in section.

Fig. 2 is a vertical longitudinal sectional detail on a plane parallel with Fig. 1 and on the line 2—2 of Fig. 3 and looking in the direction indicated by the arrows.

Fig. 3 is a vertical cross section on the line *a—a* of Fig. 2 and looking in the direction indicated by the arrows.

Referring to Fig. 1, the tractor has an engine 1, a fly wheel and clutch housing 2, a gear set housing 3, a chassis 4, drive wheels 5, a fuel tank 6, a controlling lever 7, and drive chains 8.

Referring to Figs. 1 and 2, the drive shaft or propeller shaft 9 has a worm 10 upon its rear end and the worm 10 engages two worm wheels 11 and 12, the worm wheel 11 being above the shaft 9 and the worm wheel 12 below the shaft 9. The worm wheel 11 is fixed on a shaft 13, and the worm wheel 12 is fixed upon the shaft 14. A spur gear 15 is mounted upon the shaft 14 and a spur gear 16 is mounted upon the shaft 13.

A spur gear 17 is slidably splined upon the bull shaft 18 and the latter mounted in suitable bearings and disposed transversely of the tractor. A high-speed gear 19 is also slidably splined upon the bull shaft 18 and a spur gear 20 is fixed upon the shaft 13. The gear 17 slides one way into mesh with the gear 15 and the other way into mesh with the gear 16, and the gear 19 slides into and out of mesh with the gear 20.

The gear 17 is the low speed gear and the gear 19 is the high speed gear. The gears 17 and 19 are controlled by means of the yokes 22 and 21, the yoke 22 being fixed upon the sliding rod 24, and the yoke 21 being fixed upon the sliding rod 23. The rods 23 and 24 are controlled by a ball and socket arrangement 25 and 26 connected to the shift rod 27.

The power is transmitted to the drive wheels 5 by means of the sprockets 28 and 29 loosely mounted upon the outer ends of the bull shaft 18 and from the sprockets 28 and 29 through chains 30 and 31 to the drive sprockets 32 and 33 upon the rear wheels and then to the front wheels by sprockets 34 and 35 and chains 8 to the sprockets 36 of the front wheels.

The driving wheels 5 are each provided with a series of self-cleaning sprocket teeth 37 laterally disposed across the faces of the rims 38 and alternating with wedge-shaped partitions 39 running longitudinally of the rims. These wedge-shaped partitions 39 cause the soil to be pushed off on either side of the rims thereby keeping the sprocket teeth 37 clear of dirt.

In order to provide means for turning and for differential purposes sleeves 40 extend inwardly from the sprockets 28 and 29 and have clutch teeth 41 engaging with jaw clutches 42 splined on the bull shaft 18, so that either sprocket 28 or 29 may be disconnected when desired.

A standard caterpillar or creeper type of chain 43 may be placed around each pair of wheels 5 thereby converting the tractor into a creeper type instead of a four-wheel drive. When the chains 43 are used the chains 8 may be omitted. The clutches 42 are operated in and out by the use of standard shifting levers. When one clutch is disconnected the two drive wheels on one side run idle and the two on the other side take all the power to turn the tractor around one way or the other.

The worms 11 and 12 run in opposite directions continuously while the engine is in operation and when the gear 17 is moved into mesh with the gear 16 or the gear 19 is moved into mesh with the gear 20 the tractor is driven forwardly, and when the gear 17 is moved into mesh with the gear 15 the tractor will be driven backwardly.

Various changes may be made without departing from the spirit of my invention as claimed.

I claim:

1. In a transmission gear for tractors, the combination with a motor driven shaft, of a worm fixed on said shaft, a pair of shafts journaled in bearings on opposite sides of said worm, a worm wheel carried by each of said shafts and engaging said worm, a pair of pinions of different sizes fixed on the upper one of the worm wheel carrying shafts, a pinion fixed on the lower one of the worm wheel carrying shafts, a journaled shaft arranged substantially parallel with the worm wheel carrying shafts and a pair of pinions of different sizes splined upon said last mentioned shaft an adapted to engage the pinions on the worm wheel carrying shafts.

2. In a transmission gear for tractors, the combination with a motor driven shaft, of a worm fixed on said shaft, a pair of shafts journaled in bearings on opposite sides of said worm, a worm wheel carried by each of said shafts and engaging said worm, a pair of pinions of different sizes fixed on the upper one of the worm wheel carrying shafts, a pinion fixed on the lower one of the worm wheel carrying shafts, a journaled shaft arranged substantially parallel with the worm wheel carrying shafts, a pair of pinions of different sizes splined upon said last mentioned shaft and adapted to engage the pinions on the worm wheel carrying shafts and means for shifting either one of said splined pinions so as to move the same into driving engagement with the pinions on the worm wheel carrying shafts.

3. In a transmission gear for tractors, the combination with a motor driven shaft having a worm, of journaled shafts arranged substantially at right angles to and upon opposite sides of said motor driven shaft, worm wheels carried by said journaled shafts and engaging the worm on the motor driven shaft, a third journaled shaft arranged substantially parallel with the worm wheel carrying shafts, pinions fixed on the worm wheel carrying shafts, a pinion splined upon said third shaft and adapted to be engaged with said fixed pinions and driving connections from said third shaft to the wheels of the tractor.

4. In a transmission gear for tractors, the combination with a motor driven shaft upon which is fixed a worm, of a pair of journaled shafts arranged substantially at right angles to and upon opposite sides of said motor driven shaft, worm wheels carried by said shafts, which worm wheels are in constant engagement with the worm on the motor driven shaft, a third journaled shaft arranged substantially parallel with the worm wheel carrying shafts and variable driving connections between said worm wheel carrying shafts and said third shaft.

5. In a transmission gear for tractors, the combination with a motor driven shaft upon which is fixed a worm, of a pair of journaled shafts arranged substantially at right angles to and upon opposite sides of said motor driven shaft, worm wheels carried by said shafts, which worm wheels are in constant engagement with the worm on the motor driven shaft, a third journaled shaft arranged substantially parallel with the worm wheel carrying shafts, variable driving connections between said worm wheel carrying shafts and said third shaft and driving connections from said third shaft to the wheels of the tractor.

In testimony whereof I have signed my name to this specification.

SYDNEY CLIFTON.